United States Patent
Tsukamoto et al.

(10) Patent No.: US 10,180,726 B2
(45) Date of Patent: Jan. 15, 2019

(54) KEYBOARD

(71) Applicant: LENOVO (SINGAPORE) PTE. LTD., Singapore (SG)

(72) Inventors: Yasushi Tsukamoto, Kanagawa-ken (JP); Fusanobu Nakamura, Kanagawa-ken (JP); Mitsuhiro Yamazaki, Kanagawa-ken (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 8 days.

(21) Appl. No.: 15/380,782

(22) Filed: Dec. 15, 2016

(65) Prior Publication Data

US 2017/0168578 A1 Jun. 15, 2017

(30) Foreign Application Priority Data

Dec. 15, 2015 (JP) .................................. 2015-244520

(51) Int. Cl.
*G06F 3/01* (2006.01)
*G06F 3/02* (2006.01)

(52) U.S. Cl.
CPC ................ *G06F 3/016* (2013.01); *G06F 3/02* (2013.01); *G06F 3/0202* (2013.01)

(58) Field of Classification Search
None
See application file for complete search history.

(56) References Cited

U.S. PATENT DOCUMENTS

| 2013/0120265 | A1* | 5/2013 | Horii | G06F 1/1616 345/168 |
| 2014/0085221 | A1* | 3/2014 | Kim | G06F 3/016 345/173 |
| 2014/0267065 | A1* | 9/2014 | Levesque | G06F 3/016 345/173 |
| 2017/0168578 | A1* | 6/2017 | Tsukamoto | G06F 3/016 |

FOREIGN PATENT DOCUMENTS

| JP | 2005-332063 A | 12/2005 |
| JP | 2011-048409 A | 3/2011 |
| JP | 2011-048855 A | 3/2011 |
| JP | 2015-095426 A | 5/2015 |

\* cited by examiner

*Primary Examiner* — Kent W Chang
*Assistant Examiner* — Nathaniel P Brittingham
(74) *Attorney, Agent, or Firm* — Antony P. Ng; Russell Ng PLLC

(57) ABSTRACT

A keyboard that can yield a favorable keying feeling to a user is disclosed. The keyboard includes multiple keys, a pressure sensor configured to sense a pressure used for pressing a key, a haptic device configured to generate haptic feedback that involves a micro vibration, and a feedback control unit configured to issue a signal used for driving the haptic device according to the pressure that the pressure sensor has sensed. In response to one-time key pressing, the feedback control unit issues a drive signal for generating a first haptic feedback when the pressure that the pressure sensor has sensed reaches a first threshold value, and a drive signal for generating a second haptic feedback when the pressure that the pressure sensor has sensed reaches a second threshold value.

6 Claims, 3 Drawing Sheets

1: KEYBOARD

KEYBOARD

PRIORITY CLAIM

The present application claims benefit of priority under 35 U.S.C. §§ 120, 365 to the previously filed Japanese Patent Application No. JP2015-244520 with a priority date of Dec. 15, 2015, which is incorporated by reference herein.

TECHNICAL FIELD

The present invention relates to computer keyboards in general, and in particular to a keyboard that can yield a favorable keying feeling to a user.

BACKGROUND

A computer keyboard has an operational feeling (a keying feeling) that a user's finger senses when a switch of a key that the user has pressed works. The switch of the key gives appropriate reaction force to the finger before the switch works. The reaction force that is suitable for each user has such a merit that fatigue caused by long-term operation is alleviated by making a rhythmical key operation possible and therefore a hardware keyboard that feeds back a certain degree of the keying feeling is desired.

There are several kinds of keying feelings, and the keying feeling preference is different for each user, but the keying feeling of an existing mechanical keyboard that is one of the above-mentioned keying feelings has deep-rooted popularity. On the other hand, thinning of keyboards of late years is accelerated and a plate-shaped keyboard begins to appear on the market. It is quite difficult for the plate-shaped keyboard of this type to feed back a strong keying feeling, and a user who prefers the keying feeling of the mechanical keyboard is not satisfied with the keying feeling of the plate-shaped keyboard.

The keying feeling of a mechanical keyboard is derived from two kinds of reaction force, namely, the reaction force generated by deformation of a mechanism component such as a rubber cup and so forth when a key has been pressed, and the reaction force generated when the mechanism component returns to its original shape when the user intends to take the finger off the pressed key. Therefore, simply giving some kind of feedback when the key has been pressed leaves a sense of dissatisfaction that a feeling of use of the plate-shaped keyboard greatly differs from the behavior of the keying feeling of the mechanical keyboard.

Consequently, it would be preferable to provide a keyboard that can yield a favorable keying feeling to a user.

SUMMARY

In accordance with an embodiment of the present disclosure, a keyboard includes multiple keys, a pressure sensor configured to sense a pressure used for pressing a key, a haptic device configured to generate haptic feedback that involves a micro vibration, and a feedback control unit configured to issue a signal used for driving the haptic device according to the pressure that the pressure sensor has sensed. In response to one-time key pressing, the feedback control unit issues a drive signal for generating a first haptic feedback when the pressure that the pressure sensor has sensed reaches a first threshold value, and a drive signal for generating a second haptic feedback when the pressure that the pressure sensor has sensed reaches a second threshold value. As such, the keyboard can provide a favorable keying feeling to a user.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
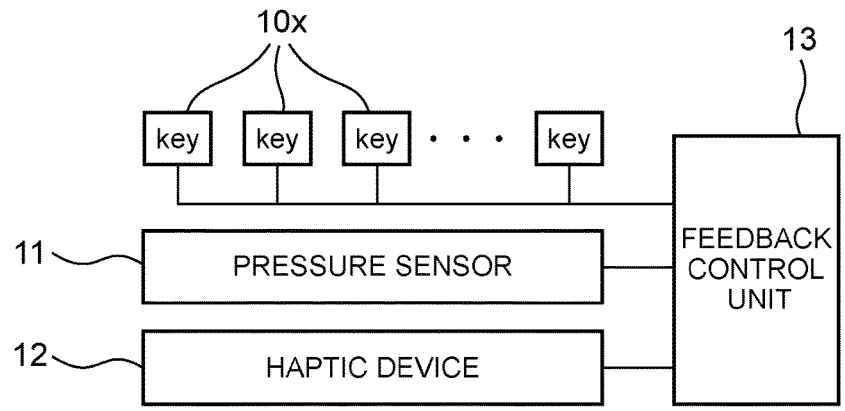
FIG. 1 is a block diagram of a keyboard, according to one embodiment of the present invention.
Figure 2:
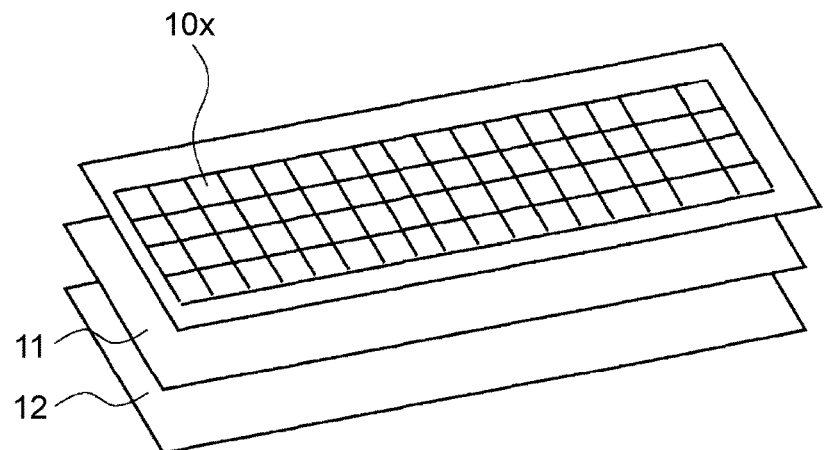
FIG. 2 is an exploded view of the keyboard from FIG. 1.

FIG. 1 is a block diagram of a keyboard 1, according to one embodiment of the present invention. FIG. 2 is an example of the keyboard 1 illustrated in the form of an exploded diagram. As illustrated in FIG. 1, the keyboard 1 includes multiple keys 10, a pressure sensor 11, a haptic device 12, a feedback control unit 13 and so forth.

The keys 10 are keys of a general keyboard. As illustrated in FIG. 2, the haptic device 12 is installed under the keys 10 and the pressure sensor 11. The pressure sensor 11 is configured into, for example, a flat form and senses pressing force which is exerted on the sensor and thereby outputs signals indicating coordinates of a place which is pressed, the strength of pressing force and so forth.

The haptic device 12 is configured into, for example, includes a mechanism is that generates a micro vibration according to a control signal from the feedback control unit 13. The haptic device 12 may employ a shape memory alloy (SMA), an eccentric rotating mass (EMP) using a piezo-electric sensor, a linear resonant actuator (LRA), electro mechanical polymer (ERM), etc. The position of a haptic device is not particularly limited, but is preferably such a position where is near the user's hand, when the user is using the input device. For example, in the ease of using a laptop PC, the haptic device may be situated near the home position of the keyboard, a palm rest, or the like.

The feedback control unit 13 controls the operation of the haptic device 12. Specifically, the feedback control unit 13 outputs a drive signal used for driving the haptic device 12 on the basis of the output from the pressure sensor 11.

The keyboard 1 includes the above-mentioned configuration and provides haptics (a haptic impression) which has emulated two kinds of reaction force, that is, the reaction force (in the following, called first reaction force) which is generated by deformation of the mechanism component such as the rubber cup and so forth when the key what is called in the mechanical keyboard has been pressed and the reaction force (in the following, called second reaction force) which is generated when the mechanism component returns to its original shape when the user intends to take the finger off the pressed key. In addition, in the following, to provide at least one kind of haptics is called haptic feedback.

In the present embodiment, the haptic feedback is performed two times corresponding to the above-mentioned two kinds of reaction force for one-time keying by a user and thereby it is possible to give the favorable keying feeling to the user.

However, simple generation of the two kinds of haptic feedback leads to occurrence of disadvantages described as follows. First, it is conceived to generate the second reaction force leaving a fixed time period after the first reaction force has been generated. A timing chart illustrating one example of a case where the haptic feedback has been generated in this way is illustrated in FIG. 3.

Figure 3:
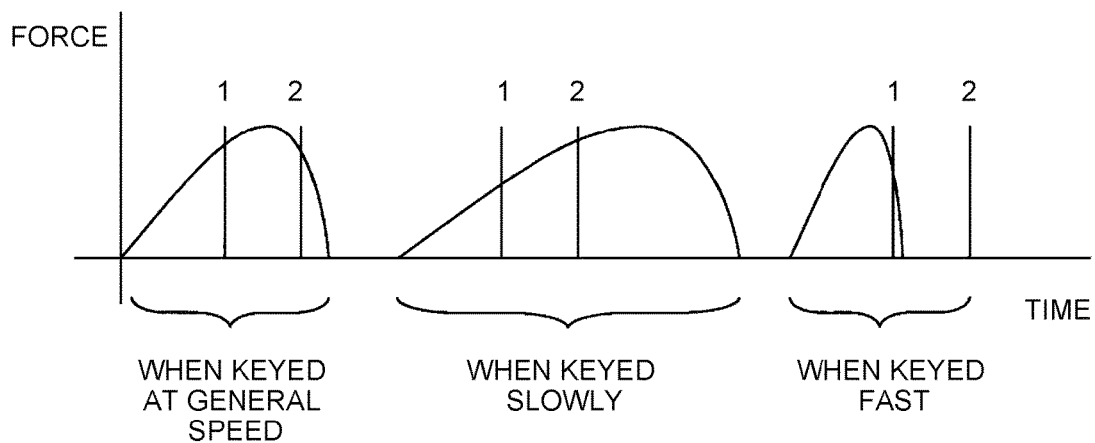
FIG. 3 is a timing diagram of a case where a haptic feedback has been generated.

In FIG. 3, the finger presses a certain key is plotted on the vertical axis, a time is plotted on the horizontal axis, and timings when the two kinds of the haptic feedback have been generated with a time lag relative to aspects of three kinds of keying are illustrated. Vertical bars which are numbered 1 and 2 indicate that the haptic feedback corresponding to the first reaction force and the haptic feedback corresponding to the second force are fed back respectively at the timings so numbered.

when the haptic feedback has been implemented the most simply, a time taken until the haptic feedback corresponding to the first reaction force is generated after the pressure has begun to be exerted is the same irrespective of whether keying is performed at a normal speed, slowly or fast is illustrated in FIG. 3. In addition, also the time taken from generation of the first-time haptic feedback to generation of the second-time haptic feedback also in a case where the two kinds of the haptic feedback are generated with a fixed time lag is illustrated.

Then, in the keying performed at the normal speed, such a favorable keying feeling is obtained that the first-time haptic feedback is generated when the force of pressing the key 10 has exceeded a predetermined magnitude of the force, and the second-time haptic feedback is generated when the user begins to take the finger off the key 10 and the pressing force has become less than the predetermined magnitude of the force. However, in case of slow keying, the second-time haptic feedback is generated while the key is being pressed as illustrated in FIG. 3. Conversely, in case of fast keying, the first-time haptic feedback is generated at last when the user begins to take the finger off the key 10, and the second-time haptic feedback of the previous key 10 is generated when another key 10 is pressed (mixed generation of the haptic feedback)

The speed at which the user inputs data through the keyboard is not constant, and therefore when a general keying speed is attained, the favorable keying feeling is obtained. However, when the keying is performed fast and slowly, the mixed generation of the haptic feedback occurs and thereby the keying feeling become unnatural. Accordingly, no favorable keying feeling is obtained from the keyboard which is designed, to simply generate two kinds of the haptic feedback. In addition, since in this method, the second-time haptic feedback generation of which is useless is generated, in particular, in case of fast keying, this method is inefficient also from the viewpoint of power consumption.

Accordingly, in the present embodiment, control which will be described below is further performed so as to provide a comfortable and favorable keying feeling. That is, in the present embodiment, the pressure which is applied to each key 10 is typically sensed. When the pressure exceeds a first predetermined threshold value, the first-time haptic feedback is generated. Next, when the pressure becomes lower than a second predetermined threshold value, the second-time haptic feedback is generated.

Figure 4A:
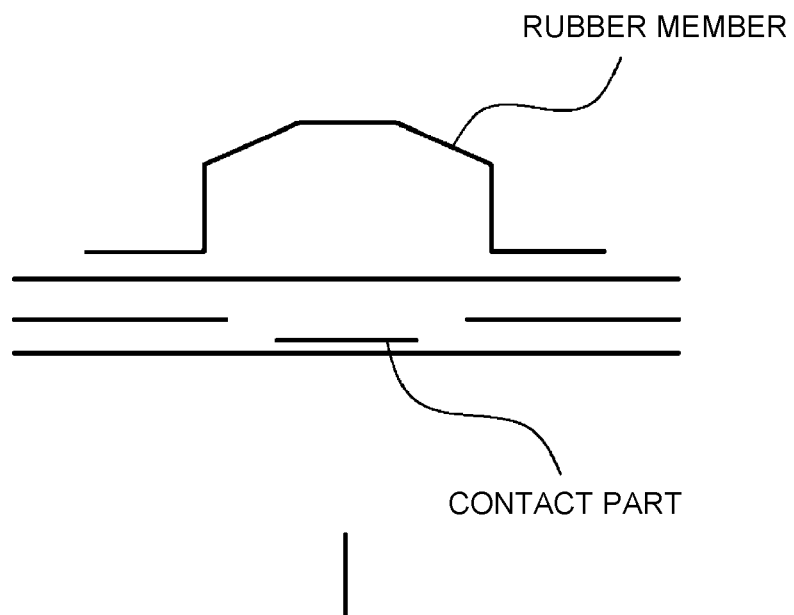
FIGS. 4A, 4B and 4C illustrate an example of the components of a key of a mechanical keyboard.
Figure 4B:
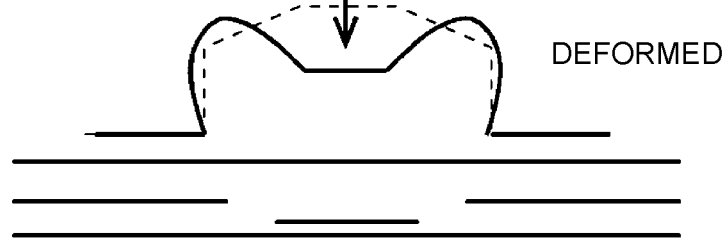
Figure 4C:
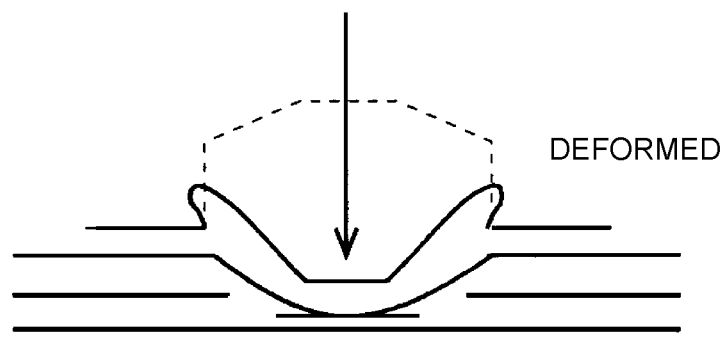

FIGS. 4A, 4B and 4C illustrate a configuration of a component of the mechanical keyboard and illustrate the outline of a general membrane key system. FIG. 4A illustrates a configuration of the mechanism component that is in a stationary state with no pressure being applied, in which a contact part is arranged under a membrane and an insulator such as a rubber member and so forth is arranged above the contact. A key cap member which is made of plastics and so forth may be arranged on the rubber member.

The rubber member deforms as the key is pressed (FIG. 4B) and the contacts comes into contact with each other and key pressing is detected (FIG. 4C).

Figure 5:
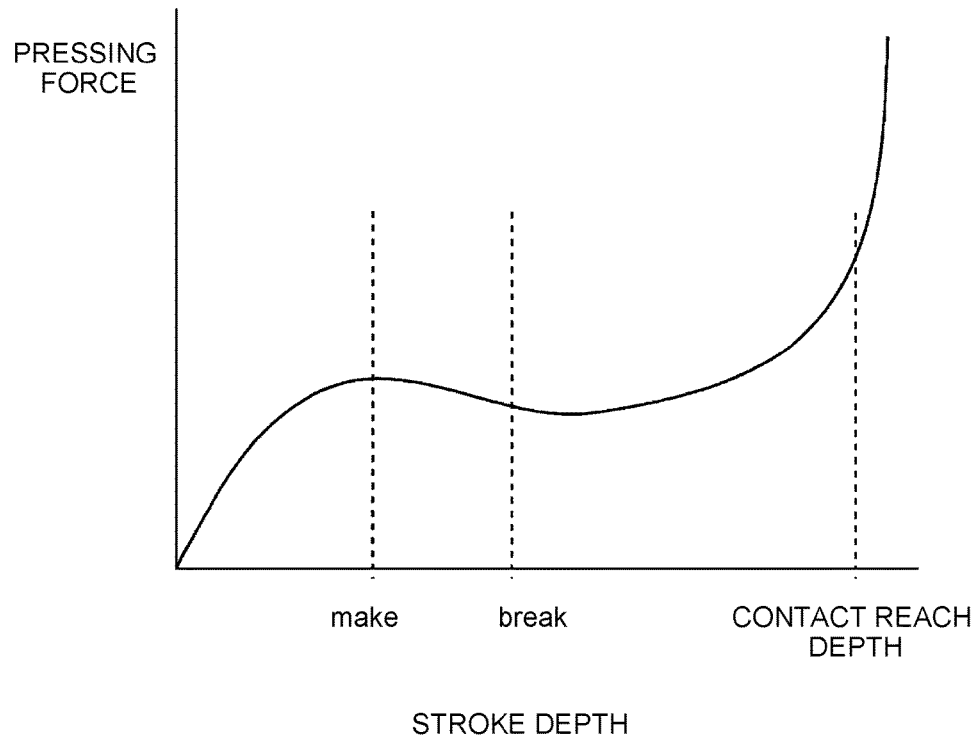
FIG. 5 is a graph illustrating an example of a relation between a depressing pressure and a haptic impression.

FIG. 5 is a graph illustrating one example of a relation between the pressing pressure and the haptic impression in such a configuration as mentioned above. When the key is pressed, the corresponding pressing force is requested in order to attain a desirable stroke depth after having started from the original point in FIG. 5.

As illustrated in FIG. 5, in the existing mechanical keyboard, it is seen that the requested pressing force reaches a peak once, collapse of the deformed rubber member occurs at that time and then the requested pressing force is lowered. The state illustrated in FIG. 4C is brought about after the peak has been attained.

In a situation where such a change in pressing force is observed, it is favorable to set the above-mentioned first threshold value to the first peak of the force which is requested for key pressing. This peak value is a value that force which works against deformation of the deformed rubber member goes critical and collapse of the deformed rubber member occurs. In the example in FIG. 5, this value is a value corresponding to "make."

Further, as illustrated in FIG. 5, it is favorable to set the above-mentioned second threshold value to a value of a point where force which works to restore the deformed rubber member to its original form in reaches a peak after the stroke depth has reached a contact reach depth and which goes beyond a valley part after the peak value. In this case, it is favorable to set the second threshold value lower than the first threshold value. In the example illustrated in FIG. 5, the above-mentioned value is a values corresponding to "break."

The second-time haptic feedback is generated and the first and second threshold values are set as described above in this way. Thereby, it becomes possible to surely perform emulation of the haptic feedback which would occur in the mechanical keyboard. Accordingly, it becomes possible to provide the keyboard which gives the favorable keying feeling to the user.

Further, the feedback control unit 13 omits generation of the second haptic feedback when a predetermined condition has been established. Thereby mixed generation of the haptic feedback is prevented and the comfortable keying feeling is given to the user.

Figure 6:
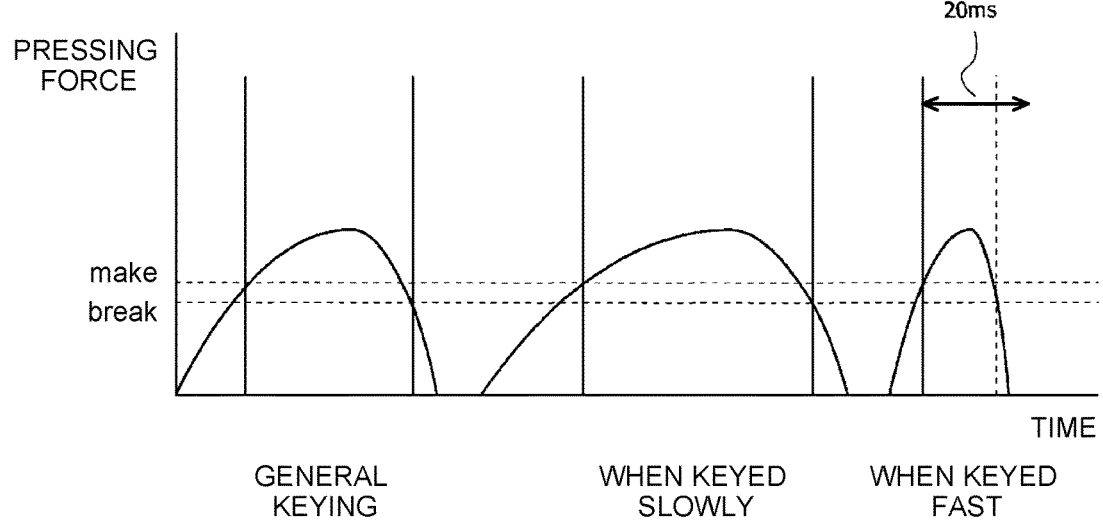
FIG. 6 is a graph illustrating an example of an operation of the keyboard from FIG. 1.

FIG. 6 illustrates one example of an operation image. How the pressing force changes as time passes by changing the speed of the keying in three aspects of general, slow and high speeds is illustrated in FIG. 6. In addition, similarly to the example in FIG. 5, the timing that the haptic feedback according to "make" against the first reaction force is generated and the timing that the haptic feedback according to "break" against the second reaction force is generated are illustrated. Incidentally, since the key 10 according to the present embodiment has no mechanical mechanism, the key 10 does not follow such a track as that illustrated in FIG. 5.

The point that when the key has been pressed fast, the haptic feedback according to "break" is not generated is one feature of the present embodiment. Whether it is fast keying is decided so when the sensed pressure has become lower than the second threshold value which is the threshold value of "break" before a predetermined time (for example, about 20 ms) elapses from generation of the haptic feedback according to "make." Incidentally, the feedback control unit 13 executes this decision.

It becomes possible to prevent mixed generation of the haptic feedback by configuring the keyboard in this way. In addition, since the useless haptic feedback is not generated, also a reduction in power consumption is realized.

Incidentally, as a concrete aspect of the key 10, also an aspect such as a touch pad which does not involve deformation is included. The diagram illustrated in FIG. 4 is of a configuration of the general membrane keyboard and does not indicate that the key 10 of the present embodiment is requested to have such a configuration as above.

In addition, although the functional configuration of the above-mentioned embodiment has been illustrated in FIG. 2, the present invention is not limited to this configuration. For example, locations of the pressure sensor 11 and the haptic device 12 may be swapped.

As has been described, the present invention provides a keyboard that can yield a favorable keying feeling to a user.

While the invention has been particularly shown and described with reference to a preferred embodiment, it will be understood by those skilled in the art that various changes in form and detail may be made therein without departing from the spirit and scope of the invention.

What is claimed is:

1. A keyboard comprising:
a plurality of keys;
a pressure sensor senses pressure from one of said plurality of keys being pressed;
a feedback control unit issues:
   a first drive signal in response to said sensed pressure reaching a first pressure threshold value, and
   a second drive signal in response to said sensed pressure reaches a second threshold value after reaching said first threshold value; and
a haptic device generates a first haptic feedback in response to a receipt of said first drive signal, and a second haptic feedback in response to a receipt, of said second drive signal; wherein,
said feedback control unit does not issue said second drive signal when said sensed pressure reaches said second threshold value in less than a predetermined time from the time that said first drive signal is issued.

2. The keyboard of claim 1, wherein said second threshold value is lower than said first threshold value.

3. The keyboard of claim 1, wherein said pressure sensor locates between said plurality of keys and said haptic device.

4. The keyboard of claim 1, wherein said pressure sensor locates underneath said plurality of keys.

5. The keyboard of claim 4, wherein said haptic device locates underneath said pressure sensor.

6. The keyboard of claim 1, wherein said first and second haptic feedbacks include micro vibrations.

* * * * *